United States Patent [19]

Fujiwara et al.

[11] Patent Number: 4,713,279
[45] Date of Patent: Dec. 15, 1987

[54] MAGNETIC RECORDING MEDIUM

[75] Inventors: Norio Fujiwara; Nobuyuki Takahashi; Akihiro Otsuki, all of Kawasaki, Japan

[73] Assignee: Fuji Electric Co., Ltd., Kawasaki, Japan

[21] Appl. No.: 852,151

[22] Filed: Apr. 15, 1986

[30] Foreign Application Priority Data

Apr. 19, 1985 [JP] Japan ................... 60-84001

[51] Int. Cl.$^4$ ............................................. G11B 5/72
[52] U.S. Cl. ................................... 428/142; 427/131;
427/132; 428/141; 428/143; 428/148; 428/216;
428/336; 428/408; 428/694; 428/695; 428/900
[58] Field of Search ............... 428/695, 694, 408, 900,
428/142, 143, 148, 216, 336, 450, 141;
360/134–136; 427/128, 131, 132

[56] References Cited

U.S. PATENT DOCUMENTS

| 4,268,369 | 5/1981 | Barlow | 427/131 |
| 4,390,562 | 6/1983 | Yanagisawa | 427/131 |
| 4,411,963 | 10/1983 | Aine | 427/131 |
| 4,503,125 | 3/1985 | Nelson | 428/408 |
| 4,554,217 | 11/1985 | Grimm | 428/900 |
| 4,647,494 | 3/1987 | Meyerson | 428/216 |

FOREIGN PATENT DOCUMENTS

| 0033521 | 10/1979 | Japan | 428/694 |
| 0145524 | 8/1985 | Japan | 428/694 |

Primary Examiner—Ellis P. Robinson
Attorney, Agent, or Firm—Spencer & Frank

[57] ABSTRACT

A magnetic recording medium is disclosed comprising a non-magnetic base plate, a magnetic layer formed on said plate, a protective layer comprising silicon dioxide formed on said protective layer, and a lubricant layer comprising amorphous carbon formed on said protective layer. The magnetic recording medium is simple to manufacture and has good CSS resistance, sparing absorptivity and high corrosion resistance.

13 Claims, 3 Drawing Figures

MAGNETIC RECORDING MEDIUM

BACKGROUND OF THE INVENTION

Field of the Invention

This invention relates to an information recording magnetic medium in the form of a disk for use with a Winchester type fixed disk device, whereby writing and reading of information is attained by a floating head.

Description of the Background

In a magnetic recording medium such as a disk, a magnetic layer of, for example, an iron oxide or a Co alloy is formed on a non-magnetic base plate by a sputtering method or a plating method. At the start or stop of the rotation of the disk, a floating head of a fixed disk device is mechanically brought into contact with the magnetic surface of a magnetic recording medium. Thus, the surface of the magnetic layer is covered by a protective layer so that the magnetic layer is not injured or a lubricating layer is formed on the magnetic layer for attaining good floating of the floating head. That is, in a fixed disk device, the head is in contact with a recording medium when the device is stopped. When the device is started, and during the change of the rotation of the disk in the range of 0 to 3,600 r.p.m., the head switches from a contact running mode to a float running mode.

On the other hand, when the device is stopped and during the change of the rotation of the disk in the range of 3,600 to 0 r.p.m., the head switches from the float running mode to the contact running mode. The head is then brought into contact with the disk at 0 r.p.m. Such a process is generally called "contact start stop" (CSS) and for CSS resistant characteristics, more than 10,000 rotations, preferably more than 20,000 rotations are required. This is considered to be an important characteristic of the reliability of a magnetic recording medium and hence of a fixed disk device.

For improving the CSS resistant characteristics, it is necessary to reduce the friction coefficient between the head and the magnetic recording medium as low as possible. This, in turn, reduces the occurrence of abrasion of the head or the magnetic recording medium. It is also necessary to protect the magnetic layer from mechanical damage during contact with the floating head by covering the magnetic layer with a layer having a mechanical character capable of avoiding injury to the ferrite head. Furthermore, when a magnetic layer is formed by a thin layer of a metal such as a Co-base alloy, the magnetic layer has a strong corrosive property and thus is liable to form a non-magnetic oxide. Accordingly, a protective layer is usually formed on the magnetic layer for improving the corrosion resistance thereof.

It is known to utilize a protective layer and a lubricating layer formed by forming a $SiO_2$ layer by a spin coating method or a sputtering method and coating thereon a prefluoropolyether liquid lubricant. It is also known to utilize a protective layer and a lubricating layer formed by forming a $SiO_2$ layer as described above and covering the layer thereof with a prefluoropolyether solid lubricant. Also known is the utilization of a protective and lubricating layer formed by forming an amorphous carbon layer on the magnetic layer by a sputtering method.

However, the protective and lubricating layer having the above-described construction have the following disadvantages.

The construction of a coating with a liquid lubricant on the $SiO_2$ layer has the disadvantage that the ratio of the viscosity of the lubricant and the coating amount thereof to attain good lubrication is delicate and hence it is not easy to establish stable coating conditions. In general, if the coating amount of a liquid lubricant is increased, the friction coefficient between a head and the magnetic recording medium is also increased. If the viscosity of a liquid lubricant is low, the coated layer shows good friction characteristics even when the coated amount thereof is increased. Hence, in the case where a liquid lubricant is used, even if the optimum conditions for the viscosity of the lubricant and the coating amount thereof has been attained the optimum conditions differ according to the condition of the surface of the base plate and the environmental conditions (in particular, humidity).

In addition, since such liquid lubricants are generally coated by a spin coating method or a dip coating method, the coating is liable to become uneven. Furthermore, when a suitable amount of a liquid lubricant is coated under conditions of high humidity and a head is placed on the magnetic recording medium in a contact stop state for a long period of time, the static friction force is greatly increased. This is considered to be caused by the existence of the lubricant between the sliding surface of the head having high surface smoothness and the surface of the magnetic recording medium. This is a phenomenon similar to the so-called linking phenomenon whereby block gages closely adhere to each other when lubrication between them occurs. The static friction force is called "adsorptive force" and when the adsorptive force becomes greater than a certain value (e.g., 6 gf), a load is applied to the head spring at the start which causes buckling. This results in injury to the surface of the magnetic recording medium by the slider end of the head. Also, if this occurrence is increased, it causes a fatal damage called "head crash" to both, the head and the magnetic recording medium.

As described above, the use of a liquid lubricant has the disadvantages that the management of the coating conditions is not easy, that such lubricant shows large dispersion for the quality thereof, and that the adsorptive force is liable to increase.

Coating a solid lubricant on a $SiO_2$ layer has the disadvantages that adhesion between the $SiO_2$ layer and the solid lubricant layer is poor and the lubricant layer lacks reliability for long periods of time. Also, for attaining good adhesion between both the layers, a very complicated step is required, for example, as follows. $Si(OH)_4$ is coated on a magnetic layer and baked to form a $SiO_2$ layer on the surface of the magnetic layer. This layer becomes porous by elimination of water at baking, which reduces the surface preciseness (smoothness). The surface quality of such a porous $SiO_2$ layer is improved by applying, for example, tape polishing. Then, after coating thereon a solid lubricant, buffing is applied to fix the solid lubricant into the pore portions. Then, the solid lubricant is welded onto the $SiO_2$ layer by baking. The protective and lubricating layers thus formed may show excellent lubricating property but the formation step thereof is complicated as described above, which is unsuitable for mass production.

An amorphous carbon layer can be formed by sputtering. The thus formed layer can be utilized as the protective and lubricating layer of a magnetic layer. In particular when a thin metal layer is used as the magnetic layer, the amorphous carbon layer has the disadvantage that it does not protect the magnetic layer from corrosion.

SUMMARY OF THE INVENTION

The object of this invention is to provide a magnetic recording medium having on the magnetic layer a protective layer and a lubricating layer which can be formed in a simple manner and having good CSS resistant characteristics, a sparingly absorptive property and a high corrosion resistance.

BRIEF DESCRIPTION OF THE DRAWINGS

In FIGS. 1a and 1b are shown a base plate 1, a Ni-P plating layer 2, a CO-P magnetic layer 3, a $SiO_2$ layer 4, an amorphous carbon layer 5, an anodically oxidized layer 6 and a $Fe_2O_3$ layer 7.

DESCRIPTION OF THE PREFERRED EMBODIMENTS

According to this invention, the above-described objects can be attained. The invention provides a magnetic recording medium comprising a non-magnetic base plate having formed thereon a magnetic layer covered by a protective layer composed of silicone dioxide and a lubricating layer composed of amorphous carbon.

In this invention, the $SiO_2$ layer contributes to protect the magnetic layer from the occurrence of mechanical damage and also to preserve good adhesion between the amorphous carbon layer having a low friction coefficient ($\mu$ is about 0.25) and the base plate.

This invention provides an amorphous carbon layer having a low friction coefficient of about 0.25, excellent lubricating properties and good adhesion to a $SiO_2$ layer. This layer is formed on the surface of a $SiO_2$ layer on a magnetic layer formed on a base plate. The $SiO_2$ layer has excellent corrosion resistance, mechanical properties and good adhesion to a non-magnetic metal base plate but sparingly giving smoothness to the surface thereof. This invention provides a magnetic recording medium having good CSS resistant characteristics and corrosion resistance, excellent corrosion resistance between the recording medium and a head and a surface with the least adsorptive power obtainable.

Now, the invention will be practically explained by referring to the following examples.

EXAMPLES

Example 1

Figure 1A:
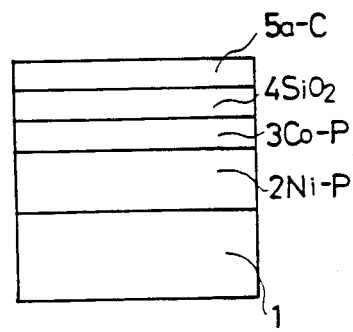
FIGS. 1a and 1b are conceptional sectional views showing the structures of two examples of the magnetic recording medium of this invention.
Figure 1B:
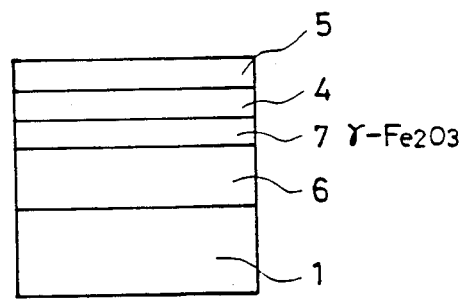

A nonelectrolytic Ni-P alloy plating was applied onto an Al-Mg alloy disk base plate to form an underlayer 2 on the base plate 1 as shown in FIG. 1 (a). The surface thereof was polished to make the surface roughness $Ra \leq 0.01$ $\mu$m. Then, a Co-P alloy magnetic layer 3 was formed on the underlayer 2 by plating at a thickness of 0.08 $\mu$m and the base plate having the magnetic layer was set on a water-cooled base plate fitting jig in a sputtering apparatus. After evacuating the apparatus to $5 \times 10^{-6}$ torr, an argon (Ar) gas was flowed therethrough and the pressure in the apparatus was controlled to $5 \times 10^{-3}$ torr by controlling valve(s). Then, after applying pre-sputtering for 5 minutes at a high frequency electric power of 1 kw, a shutter was opened and sputtering of $SiO_2$ was applied onto the magnetic layer for 6 minutes at a high frequency electric power of 500 w to form a $SiO_2$ layer 4 of 230 Å in thickness on the magnetic layer 3. Then, the base plate was moved from the position of the $SiO_2$ target to a graphite target. After applying pre-sputtering of carbon for 5 minutes at an argon gas flow of 15 SCCM, in vacuum of $5 \times 10^{-3}$ torr, and at an electric power of 1 kw, and carbon sputtering was applied onto the $SiO_2$ layer 4 for four minutes under the same conditions as in the above pre-sputtering to form thereon an amorphous carbon layer 5. The thickness of the amorphous carbon layer 5 thus formed was 265 Å.

Figure 2:
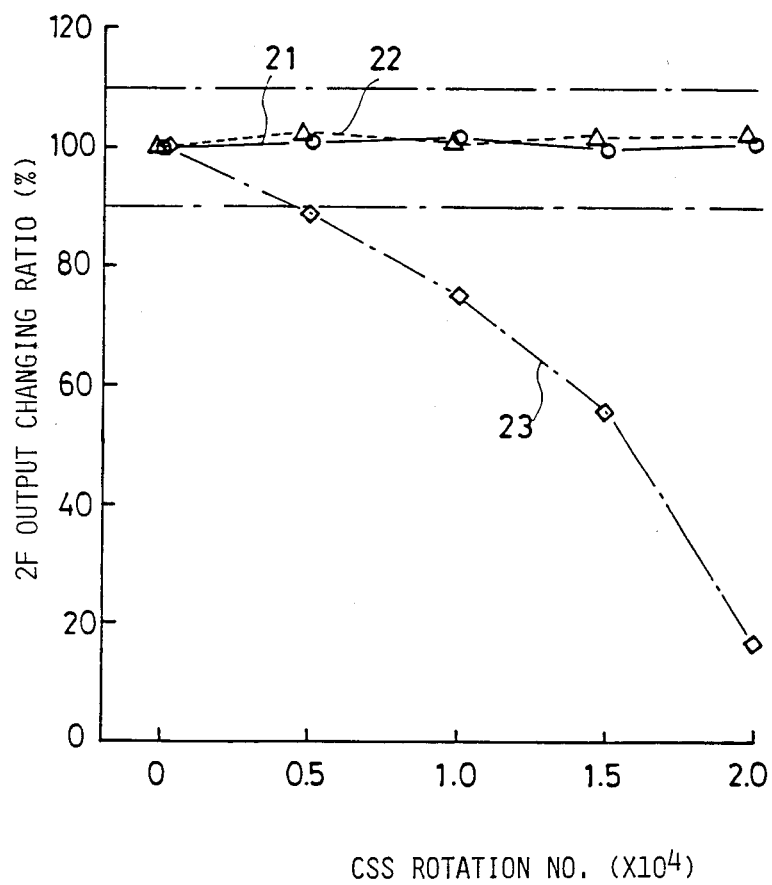
FIG. 2 is a graph showing the change of output in a CSS resistant test for the magnetic recording medium of an example of this invention and for a conventional example.

When a CSS characteristic test was applied to the magnetic recording medium thus prepared, no damage was observed on the surface of the recording medium even after 20,000 rotations in the test as well as no change was observed about the electromagnetic conversion characteristics such as 2F output, resolving power, etc., as shown by line 21 in FIG. 2. The 2F output changing ratio shown in FIG. 2 is the ratio of the change to the initial value of 2F output, and the domain between the levels of 90% and 110% shown by chain lines in FIG. 2 is the aimed or desired range for practical use.

Line 23 in FIG. 2 stands for the data on a comparison sample prepared by forming a $SiO_2$ layer of about 400 Å on the magnetic layer having the same structure as above by spin coating and then forming thereon a lubricating layer of about 800 Å in thickness as metal by coating a solid lubricant on the $SiO_2$ layer followed by baking.

Figure 3:
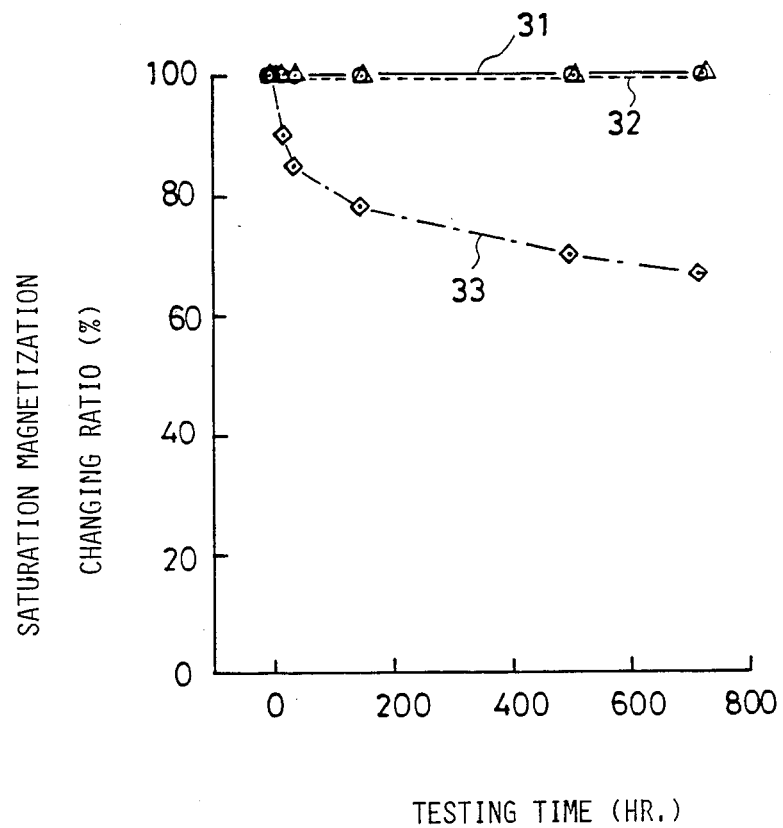
FIG. 3 is a graph showing the change of the saturation magnetization with the passage of time for the magnetic recording medium of an example of this invention and a conventional example.

Also, other magnetic recording media prepared by the same conditions as the above sample were immersed in water purified using an ion exchange resin at 25° C. and when sampling was properly performed thereafter and the change of the saturation magnetization was observed on each sample by means of a vibration-type magnetometer, no change was observed even after 720 hours as shown by line 31 in FIG. 3.

Line 33 in FIG. 3 stands for the data on a comparison sample prepared by applying a Ni-P alloy plating onto the surface of an aluminum base plate, polishing the surface thereof so that the surface roughness Ra became the same as or less than 0.01 $\mu$m, forming thereon a magnetic layer composed of a Co-P alloy by plating, and further forming thereon an amorphous carbon layer of 250 Å in thickness by sputtering. Also, the change ratio of saturation magnetization in FIG. 3 is the ratio of the change to the initial value of saturation magnetization Bs.

Example 2

An anodically oxidized layer 6 was formed on an Al-Mg alloy base plate 1 as shown in FIG. 1 (b) and the surface was polished so that the surface roughness Ra became the same as or less than 0.01 $\mu$m. After forming thereon an $Fe_3O_4$ layer of 0.17 $\mu$m in thickness by sputtering, an oxidation treatment was applied thereto for 3 hours at 300° C. to form a magnetic layer 7 composed of α-Fe$_2$O$_3$. After sufficiently washing it, the base plate was set on a water-cooled base plate-fitting jig in a sputtering apparatus. After evacuating the apparatus up to $5 \times 10^{-6}$ torr, an argon gas was caused to flow throughout at 10 SCCM and the pressure in the apparatus was controlled to $5 \times 10^{-3}$ torr by controlling valve(s). Then, after applying pre-sputtering for 5 minutes at a high frequency electric power of 1 kw, sputtering of SiO$_2$ was applied onto the magnetic layer for 6.5 minutes at a high frequency electric power of 500 w to form a SiO$_2$ layer 4 of 250 Å in thickness. Then, the vacuum was broken, the SiO$_2$ target was removed, and after fitting a graphite target, the pressure was adjusted to $5 \times 10^{-6}$ torr. An argon gas was flowed through the sputtering apparatus at 15 SCCM and after adjusting the pressure in the apparatus to $5 \times 10^{-3}$ torr, pre-sputtering was applied for 6 minutes at a high frequency electric power of 1 kw. Then, carbon sputtering was applied for 4 minutes at the same high frequency electric power as above to form an amorphous carbon layer 5 of 260 Å in thickness.

When a CSS characteristics test was performed on the magnetic recording medium thus prepared, no damage was observed on the recording medium even after 20,000 rotations in the test as well as no change was observed about the electromagnetic conversion characteristics such as F2 output, resolving power, etc., as shown by line 22 in FIG. 2. Also, the saturation magnetization was not changed as shown by line 32 in FIG. 3.

What is claimed is:

1. A magnetic recording medium comprising
   a non-magnetic base plate,
   a magnetic layer formed on said plate,
   a protective layer comprising silicon dioxide formed on said magnetic layer, and
   a lubricant layer comprising amorphous carbon formed on said protective layer.

2. The magnetic recording medium of claim 1, wherein the magnetic layer comprises a Co-based alloy.

3. The magnetic recording medium of claim 1, wherein the non-magnetic base plate is formed of an Al-Mg alloy.

4. The magnetic recording medium of claim 3, wherein
   the magnetic layer is a non-electrolytic Ni-P alloy plating applied onto the base plate.

5. The magnetic recording medium of claim 1, wherein the magnetic layer is made of a Co-P alloy.

6. The magnetic recording medium of claim 1, wherein the protective layer is between about 230 Å and 250 Å thick.

7. The magnetic recording medium of claim 1, wherein the lubricant layer is between about 260 Å and 265 Å thick.

8. The magnetic recording medium of claim 1, wherein the protective layer is applied by sputtering.

9. The magnetic recording medium of claim 1, wherein the lubricating layer is applied by sputtering.

10. The magnetic recording medium of claim 1, wherein
    the surface roughness of the base plate is about equal to or less than 0.01 μm.

11. The magnetic recording medium of claim 1, wherein the luricating layer is formed by
    presputtering argon gas, and then
    sputtering amorphous carbon.

12. The magnetic recording medium of claim 1, wherein the lubricating layer has a friction coefficient of about 0.25.

13. The magnetic recording medium of claim 1, wherein the magnetic layer is made of a γ-Fe$_2$O$_3$ alloy.

* * * * *